Aug. 12, 1958     C. SCHOFIELD     2,847,376
APPARATUS FOR ELECTROCLEANING WELDS
IN INTERNAL CORNERS
Filed Nov. 5, 1954     2 Sheets-Sheet 2
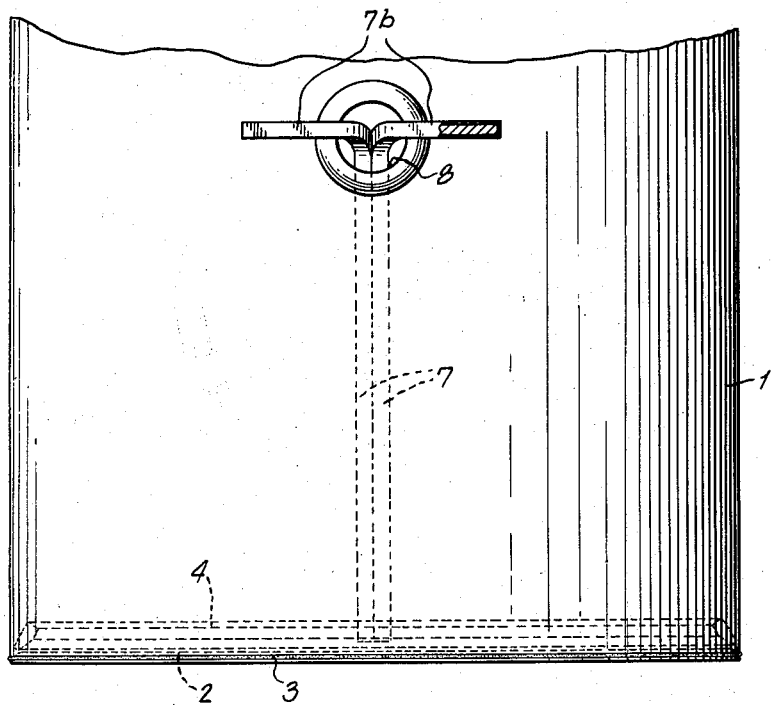
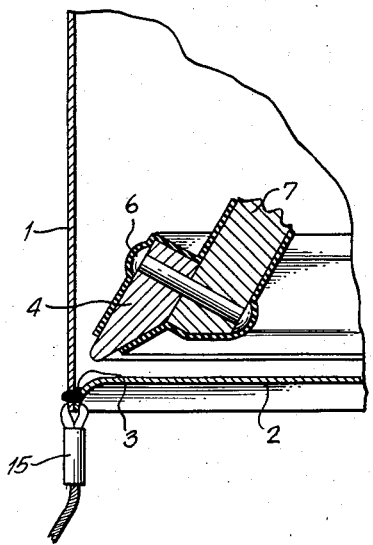
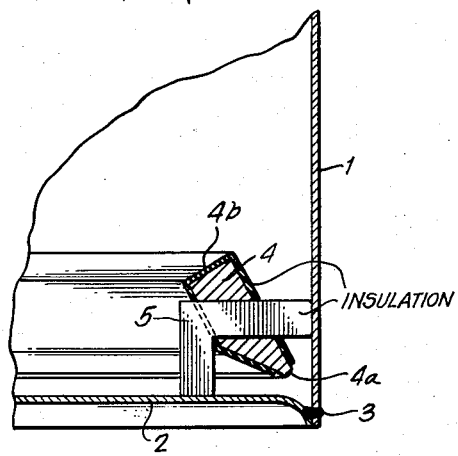
INVENTOR.
CECIL SCHOFIELD
BY
Robert S. Dunham
ATTORNEY ated Aug. 12, 1958

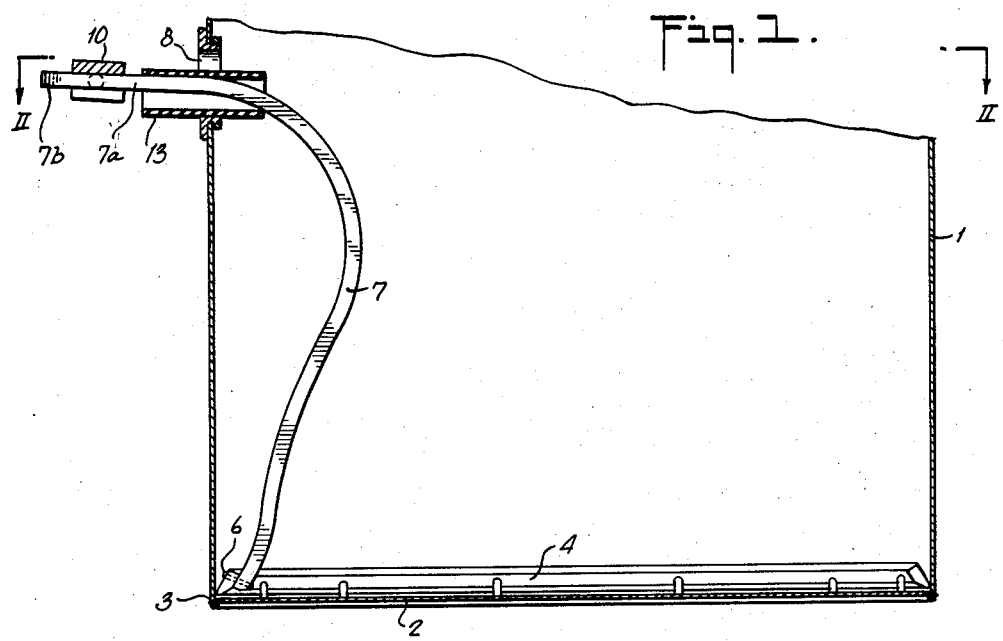
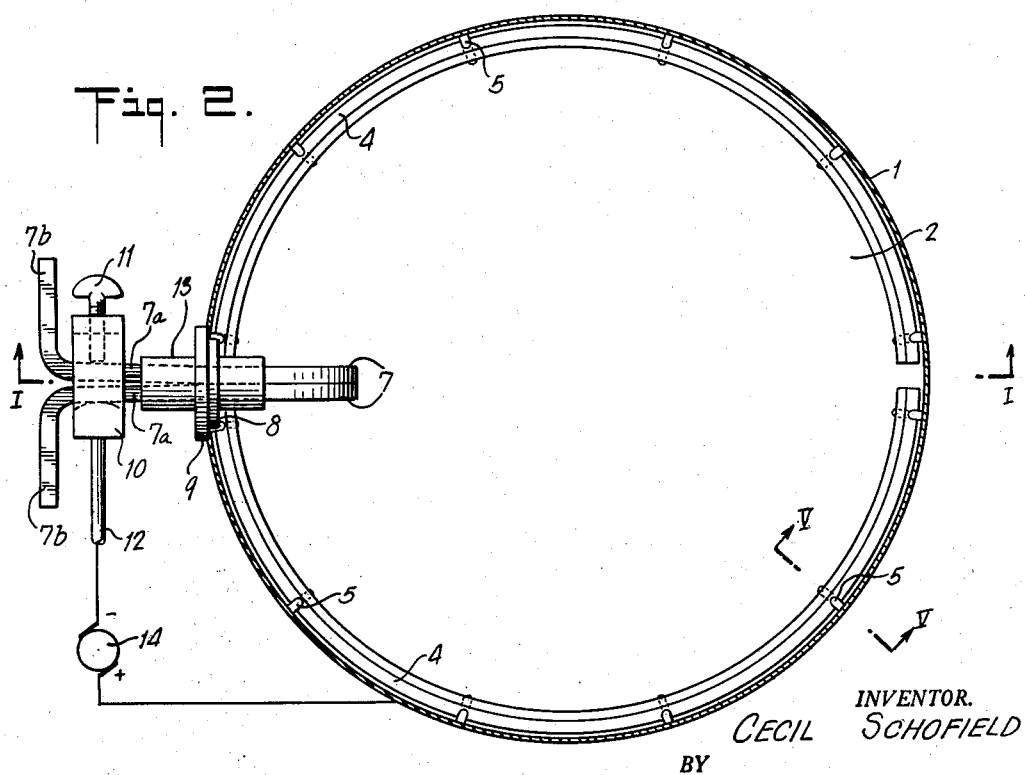

United States Patent Office 2,847,376
Patented Aug. 12, 1958

2,847,376

APPARATUS FOR ELECTROCLEANING WELDS IN INTERNAL CORNERS

Cecil Schofield, Lakewood, Ohio, assignor to Republic Steel Corporation, Cleveland, Ohio, a corporation of New Jersey Application November 5, 1954, Serial No. 467,171

7 Claims. (Cl. 204—224)

This invention relates to a method and apparatus for electrolytically removing oxides from weld surfaces and adjacent areas in internal corners. The invention is described herein as applied to the electrocleaning of internal corners at the ends of cylindrical steel drums or barrels. Certain features of the invention are of particular utility in connection with this specific cleaning problem. Other features are of more general utility.

In the manufacture of steel articles, e. g., enclosed steel articles such as drums, it is fairly common to join the component parts by means of welding, e. g., an internal dihedral angle. The welding operation typically leaves an oxide coating on the weld material and in some cases on the base metal adjacent to the weld. In many cases, it is desirable for one reason or another to remove this oxide coating. In some instances, the appearance of the finished product is important. In other instances, as in the case of the welds inside the ends of stainless steel drums, the oxides left by the welding operation may have some undesirable chemical activity in connection with the material which is to be stored in the drum. Specifically, where the drum is used to store food or a food product, the food may be contaminated or have its palatability affected by contact with the oxide.

These oxide coatings are very difficult to remove, especially in the case of materials such as stainless steels. The method commonly used in the past for removal of such coatings has been sand or grit blasting. Such a sand blasting operation is expensive and cumbersome. Furthermore, it is hard to remove completely all the sand or grit particles remaining in the crevices.

An object of the present invention is to provide an improved apparatus for cleaning a weld in an internal corner rapidly and without adversely affecting the base metal.

Another object is to provide improved apparatus for electrocleaning in an internal corner.

Another object is to provide apparatus for electrocleaning in an inside corner at the end of a steel barrel or drum.

The foregoing and other objects of the invention are attained by providing an elongated electrode contoured to fit in the corner to be cleaned. In the case of a drum end corner, a semi-circular electrode is preferred. Spacers are attached to the electrode at intervals to engage the sides of the corner and hold the electrode in a predetermined spacing with respect to the corner.

Two such semi-circular electrodes are employed, so as to form a substantially complete circle slightly smaller in diameter than the drum. A pair of handle bars are attached to adjacent ends of the two electrodes. These handle bars are contoured to extend upwardly and inwardly of the drum and then out through a bung hole in the side of the drum. The outer ends of the handle bars are curved away from one another. A clamp engages the outer ends of the bars and forces them toward each other, thereby forcing the spacers on the electrodes against the internal corners at the ends of the drum. The electrode is made with a cross-section having a projection extending toward the corner, and is provided with an electrically insulating, acid-resistant coating on all its surfaces except the tip of the projection. Suitable insulation is provided for the bars. The clamp which engages the outer ends of the handle bars is employed as one terminal for the supply of electrical energy and the drum itself serves as the other terminal.

In carrying out an electrocleaning process with the apparatus described, the drum is stood on end and a suitable cleaning acid is inserted into the drum through the bung hole, in sufficient quantity to cover the electrode and the weld being cleaned. The electrodes and their attached handle bars are then inserted one at a time through the bung hole, and are maneuvered into position by manipulation of their outer ends. The two handle bar ends are then clamped together, electrical connections are made, and electricity is turned on for the period of time required.

Other objects and advantages of the invention will become apparent from a consideration of the following specification and claims, taken together with the accompanying drawings.

In the drawings:

Fig. 1 is a vertical sectional view taken through a drum on the line I—I of Fig. 2, and showing in elevation electrocleaning apparatus embodying the invention;

Fig. 2 is a sectional view taken on the line II—II of Fig. 1;

Fig. 3 is an elevational view from the outside of the barrel showing the projecting ends of the handle bars, and illustrating a modified form of handle bar structure;

Fig. 4 is an enlarged fragmentary sectional view similar to Fig. 1, illustrating a detail; and Fig. 5 is an enlarged sectional view taken on the line V—V of Fig. 2, looking in the direction of the arrows.

Referring to the drawings, there is shown a steel drum or barrel, having a cylindrical side wall 1 and a head or end wall 2, which are welded together. In the welding process which produces the weld structure shown in the drawings, the weld is made about the outside of the peripheral wall 1 of the barrel, with deep penetration so as to form an oxide coated bead 3 in the crevice between wall 1 and the head 2. The oxide coating may extend not only over the bead 3 but also onto adjacent areas of the wall 1 and head 2. The oxide coating may appear on the side of the metal where the welding operation is performed, or on the opposite side, as in the present instance. The present invention is applicable to the electrocleaning of oxides from all such coated surfaces. Where reference is made in the present specification and claims to "electrocleaning a weld," the term "weld" is intended to include generically all such coated surfaces.

Inside the drum adjacent the weld 3, there are provided two elongated electrodes 4, each having a generally semi-circular lengthwise contour. At spaced intervals along the length of the electrode, L-shaped insulators 5 (best seen in Fig. 5) are press fitted through suitable apertures in the electrode. The electrode 4 has a cross-sectional contour including a projection 4a (see Fig. 5) at the end nearest the corner. The horizontal leg of the insulator 5 is adapted to engage the side wall 1 of the drum, whereas the vertical leg of the insulator 5 is adapted to engage the end wall 2. When the legs of insulator 5 are both engaging the drum, then the projection 4a is accurately positioned with respect to the corner of the drum.

All surfaces of the electrode 4, except the projection or tip 4a, are provided with an insulating coating 4b. This insulating coating prevents shorting of the electrode against the barrel and also concentrates the current at the bare electrode tip, which is pointed in the direction of the area to be cleaned. The cleaning action is thereby largely confined to the oxide coated area only, and the attack on the base metal of the barrel is restricted.

Attached to one end of the electrode 4, as by means of a rivet 6 (Fig. 4) is a handle bar 7. The bar 7 is elongated, and like the electrode 4 is of a good electrical current conducting material such as copper. The bar 7 is contoured so that it extends upwardly and inwardly from the electrode 4 and thence outwardly through a bung hole 8 formed in the side of the steel drum.

As best seen in Fig. 2, two electrodes 4 are employed in electrocleaning one end of the barrel, the two electrodes being right and left hand and forming substantially a complete annulus around the end of the barrel. The electrodes 4 are made somewhat shorter than necessary to form a complete annulus so as to allow a small space between the ends of the electrodes for maneuvering when the electrodes are being placed in the barrel. The two handle bars 7 for the two electrodes 4 are attached to adjacent ends of the electrodes and extend closely parallel to each other inside the barrel. The free ends of the handle bars 7, outside the barrel, bend outwardly at a small angle away from one another, as shown at 7a. The extremities of the bars 7 are bent outwardly at right angles, as shown at 7b, to form handles which facilitate manipulation of the electrodes as they are inserted in the barrel. A generally U-shaped clamp 10 engages the outwardly bent portion 7a of the handle bars. The clamp 10 is provided with a thumb screw 11. Tightening the thumb screw 11 forces the outwardly bent portion 7a of the handle bars toward each other and thereby tends to spread the inner ends of the handle bars 7a, with the result that the insulators 5 are held tightly against the side and end of the barrel, thereby accurately locating the electrode tips 4a with respect to the weld to be cleaned. An electric cable 12 is attached to the clamp 10 for supplying electric current through the handle bars to the electrodes 4. Another suitable electrical terminal is attached to the outside of the barrel, in any convenient manner, for example, as shown at 15 in Fig. 4. These terminals are connected in an electric circuit indicated diagrammatically in Fig. 2, including a suitable source of electrical energy, such as a generator 14. A direct current is much more effective than an alternating current, although an alternating current may be successful in cleaning small localized areas.

An insulator 13 encircles the bars 7 where they pass through the bung hole 8. A simple piece of rubber hose, split lengthwise to facilitate mounting, has been found to be satisfactory.

It has been found preferable, as an alternative to the use of the insulator 13, to provide an electrically insulating plastic coating 16 on the entire electrode and handle bar assembly. In carrying out this feature of the invention, the handle bars are first attached to the electrodes by means of the rivets 6 and the assemblies are then dipped in a molten bath of insulating plastic material to provide a coating approximately ⅛ inch thick. After the coating is cooled, it is scraped from the tip of the electrode, and also from the region where the clamp 10 is to be applied. One of the bars 7 is shown in cross-section in Fig. 3 to illustrate the plastic coated structure.

In carrying out an electrocleaning operation with the apparatus described above, there is first inserted through the bung hole 8 a suitable quantity of an acid electrolytic pickling solution, sufficient solution being provided to fully cover the electrodes 4.

This invention is not limited to use with any specified material in the barrel or drum or in the weld, nor to any specific acid pickling solution. The following solutions are given, however, by way of example, as having been found satisfactory in the case of stainless steel drums:

(1) A water solution containing 40 to 50% by volume of phosphoric acid (85% $H_3PO_4$ by weight).

(2) A water solution containing 10 to 25% by volume of sulphuric acid (95% $H_2SO_4$ by weight).

(3) A water solution containing 10 to 25% by volume of sulphuric acid (95% $H_2SO_4$ by weight) and 40 to 25% by volume of phosphoric acid (85% $H_3PO_4$ by weight).

(4) A water solution containing about 10 to 30% by volume of nitric acid (61.4% by weight, 40° Baumé technical grade).

After the acid is inserted, the electrodes and their attached handle bars are inserted through the bung hole, being threaded through one after the other. The two electrodes are then manipulated into the positions illustrated in the drawings.

A suitable electric current is then transmitted through the electrodes 4, the pickling solution, and the weld 3. It has been found satisfactory in the case of stainless steel barrels of 22⅜" inside diameter to use 100 to 300 amperes per square foot current density, depending upon the time allowed, at a voltage of 8 to 10 volts D. C. This current is supplied for three to seven minutes, depending upon the degree of removal of the weld oxide required and the total current used. The drum or barrel is used as the positive electrode in the electrolytic cleaning process, and the electrodes 4 serve as the cathodes or negative electrodes.

After one end of the drum is cleaned, it is turned end for end, the electrodes are relocated, and the current is again applied.

Even without the electric current, some cleaning is effected on the smooth exposed surfaces by the acid electrolyte. This action is especially effective over areas where the oxide coating is not very thick. However, by the use of electric current, proper cleaning is effected even in the difficultly accessible crevices at the joint between the end and the side wall.

There may in some cases be an electropolishing action, with a slight but unobjectionable attack, on the base metal adjacent the weld. However, the base metal is never attacked to an undesirable extent through the use of this method and apparatus.

While I have shown and described a preferred embodiment of my invention, other modifications thereof will readily occur to those skilled in the art, and I therefore intend my invention to be limited only by the appended claims.

I claim:

1. Apparatus for electrocleaning welds at the internal corners of a metal drum having a bung hole, comprising a pair of elongated electrodes, each having a semicircular lengthwise contour, said electrodes together forming a substantially complete circle having a diameter slightly smaller than that of one end of the drum, spacer means of insulating material attached to said electrodes and adapted to engage both sides of a corner, a pair of elongated handle bars, one attached to each electrode at adjacent ends thereof, said bars having a curved lengthwise contour such that when the electrodes are adjacent one end of the drum, with said spacer means engaging said one end and the adjacent side, the bars are spaced inwardly from the sides of the drum and the free ends of the bars project outwardly through the bung hole, said bars extending closely parallel throughout most of their length and being curved away from each other adjacent their outer ends, a clamp engaging said outer ends and forcing them toward each other and thereby forcing said spacer means against the sides and ends of the drum, and means for supplying electric current to the outer ends of the bars.

2. Apparatus as defined in claim 1, in which said current supplying means comprises said clamp and a cable attached thereto.

3. Apparatus for electrocleaning a weld at an internal corner of a metal drum having a bung hole, comprising an elongated bar electrode having an arcuate lengthwise contour with a radius of curvature slightly smaller than that of one end of the drum, spacer means of insulating material attached to said electrode and including first leg means extending axially from said electrode and adapted to engage an end of the drum and second leg means extending radially outwardly from said electrode and adapted to engage a side of the drum, an elongated handle bar attached to one end of said electrode and extending diagonally therefrom in a direction radially inward and axially opposite to said first leg means, said handle bar having a curved lengthwise contour such that when the electrode is in a position adjacent one end of the drum, with said spacer means engaging said one end and the adjacent side, the bar is spaced inwardly from the side of the drum and the free end of the bar projects outwardly through the bung hole, said electrode and the adjacent portion of said bar being insertable into the drum through said bung hole, and means for transmitting electric current through the bar, the electrode and the drum.

4. Apparatus for electrocleaning a weld at an internal corner of a metal structure, comprising an elongated bar electrode having a lengthwise contour corresponding to that of the corner and a lateral projection extending along one side of the bar, spacer means of insulating material attached to said electrode and having first and second leg means extending at an angle to each other and on opposite sides of said projection, said leg means being adapted to engage the respective sides of the corner so as to maintain said electrode in spaced relation to both said sides and oriented so that said projection points toward said corner, electrical insulating means covering all the surface of said electrode except for a lengthwise strip thereof along the apex of said projection, and means for transmitting electric current through said electrode and said corner.

5. Apparatus as defined in claim 4, comprising handle means attached to said electrode and operable to hold the first and second leg means in firm engagement with said sides to fix the spacing between the electrode and the corner.

6. Apparatus as defined in claim 5, in which said handle means comprises a bar attached to said electrode and forming a part of said current transmitting means, and means for applying to said bar a force acting in a direction to hold the first and second leg means in firm engagement with said sides to fix the spacing between the electrode and the corner.

7. Apparatus as defined in claim 4, in which said first and second leg means are angularly spaced from said strip, so that no portion of either of said leg means is between the strip and the corner when said leg means are engaging the respective sides of the corner.

References Cited in the file of this patent

UNITED STATES PATENTS

| | | |
|---|---|---|
| 1,526,644 | Pinney | Feb. 17, 1925 |
| 1,793,069 | Dunkley | Feb. 17, 1931 |
| 2,072,170 | Herzog | Mar. 2, 1937 |
| 2,590,927 | Brandt | Apr. 1, 1952 |

FOREIGN PATENTS

| | | |
|---|---|---|
| 536,322 | Germany | Oct. 22, 1931 |
| 261,132 | Switzerland | Aug. 1, 1949 |
| 758,189 | Germany | Nov. 4, 1952 |

UNITED STATES PATENT OFFICE
CERTIFICATE OF CORRECTION

Patent No. 2,847,376                                                August 12, 1958

Cecil Schofield

It is hereby certified that error appears in the printed specification of the above numbered patent requiring correction and that the said Letters Patent should read as corrected below.

Column 6, line 30, list of references cited, under the heading "FOREIGN PATENTS" for "536,322" read -- 536,323 --.

Signed and sealed this 5th day of May 1959.

(SEAL)
Attest:

KARL H. AXLINE
Attesting Officer

ROBERT C. WATSON
Commissioner of Patents